United States Patent [19]

Hamilton et al.

[11] 4,139,254
[45] Feb. 13, 1979

[54] SELF-RETAINING RECEPTACLE BOX

[75] Inventors: Richard M. Hamilton, North Oaks; James A. Sievert, Stillwater, both of Minn.

[73] Assignee: Minnesota Mining and Manufacturing Company, St. Paul, Minn.

[21] Appl. No.: 849,085

[22] Filed: Nov. 7, 1977

[51] Int. Cl.² .................. H01R 13/60; H02G 3/08
[52] U.S. Cl. .................. 339/122 R; 174/54 R; 220/3.7
[58] Field of Search .......... 339/122 R, 125 R, 270 R; 174/52 R, 54, 58, 61, 63, 65 R; 220/3.6, 3.7, 3.9

[56] References Cited

U.S. PATENT DOCUMENTS

| | | | |
|---|---|---|---|
| 2,819,331 | 1/1958 | Bladh | 174/52 R |
| 3,136,523 | 6/1964 | Munroe | 174/52 R |
| 3,144,503 | 8/1964 | Fischer | 174/52 R |

Primary Examiner—Roy Lake
Assistant Examiner—E. F. Desmond
Attorney, Agent, or Firm—Cruzan Alexander; Donald M. Sell; John C. Barnes

[57] ABSTRACT

A self-attaching receptacle box adapted for use with light fixtures to afford a quick connection for the light fixture wiring to a source of current comprises a rectangular housing having in one wall thereof an opening for receiving the wires and a projection adjacent one edge of the opening, and a slotted opening in said wall opposite the projection through which extends a clamp portion of a block. The block has a threaded opening to receive a screw extending from an adjacent wall member which permits the block to be moved toward and away from the wire-receiving opening to clamp the projection and clamp portion of the block against opposite edges of a standard knock-out opening of the light fixture or other supporting panel.

1 Claim, 2 Drawing Figures

SELF-RETAINING RECEPTACLE BOX

BACKGROUND OF THE INVENTION

1. Field of the Invention

This invention relates to an improvement receptacle or junction boxes and in one aspect to an improvement in the mounting means for affixing receptacle or junction boxes to supporting panels and/or light fixtures.

2. Description of the Prior Art

Prior techniques for the mounting of receptacle boxes to a support panel, such as a panel of a light fixture, have been done by the manufacturer of the panel since a special opening requiring special tooling had to be formed in the panel at the time of manufacture. These special openings then fit the particular box and generally the attaching member was positioned perpendicular to the panel. The attaching member was generally a bolt fitting through an opening in the panel and threaded into an opening in the contacting wall of the box.

Alternatively, the light fixture may be hard-wired to permanently connect the fixture to the circuit. This was done using rigid or flexible metal conduit which is connected to the fixture using the standard one/half inch prescored knockout openings wherein the slug or disk is knocked out to form the opening for accepting the cnduit end on which is received a threaded washer. Attachment of these conduit couplers requires getting access to the inside of the electrical fixture to apply the locking washer.

Where it is desired to connect the fixture wires to permit quick disconnection of the fixture from the current source the use of a junction box or receptacle box having a quick disconnect electrical termination receptacle is desired. The disconnect terminal of the present invention permits prewired junction boxes to be readily attached to the wired fixture without access to the interior of the fixture.

Some of the known prior patents relating to mounting means for electrical components such as the lamp holders for fluorescent lamps include U.S. Pat. No. 3,384,858, issued May 21, 1968 to G. Johnson. In this patent a special opening is shown in the panel for the fixture which receives the lamp holder. The lamp holder is resiliently held in the opening by a spring member and is carried by an L-shaped bracket which extends through the opening to the top side of the fixture panel. This L-shaped bracket provides the support. This does not provide a positive connection such as may be afforded by using screw fasteners since the screw fastener insures the electrical continuity for grounding purposes between the member and the panel and it provides a more positive lock than provided by a spring member.

A further patent illustrating the use of a screw fastener is U.S. Pat. No. 3,363,217, issued Jan. 9, 1968 to W. J. Graver et al. In this patent the device illustrated in FIGS. 10 and 11 includes a special electrical socket secured to the panel of a light fixture for connecting the lamps to the source of current. In this structure the panel again has a special opening to receive the extension 42 of the housing member and a prescribed opening is formed in the panel for receiving the fastening screw. This housing member is formed of insulative material, and thus the screw is not used for electrical continuity but for permanent fastening. this structure does not teach the fastening for a box which is universal and therefore can be added either by the manufacturer or in the field without the use of special tools. It further does not provide a mounting structure which can be installed on panels where the space is restricted such as onto a fixture which is close to a ceiling where there is substantially no work space available for use during installation or removal of the box. Most of the prior art devices require the fasteners to be installed perpendicular to the panel.

Another form of electrical attachment requires the removal of the panel to make the attachment and then the reinsertion of the panel. Such a mounting structure is illustrated in U.S. Pat. No. 2,433,511, issued Dec. 30, 1947 to Goddard. In this structure the fastener is again perpendicular to the panel and a wire guide is utilized to assist in the mounting in that a lip is formed on the wire guide to project through one opening in the mounting panel spaced from the opening for the screw fastener. This mounting structure again requires the screw to be perpendicular to the panel and the screws for the panel are perpendicular, thus there is a space requirement involved to effect a connection or disconnection of the box with the panel and it fails to achieve the convenience of the mounting structure of the present invention, the versatility in that it could be used on any of the standard half-inch knock-outs, and it cannot be installed on stock fixtures with no modifications to the fixtures or installed on existing fixtures during field modifications.

SUMMARY OF THE INVENTION

The electrical receptacle box or junction box of the present invention comprises a mounting structure such that the receptacle boxes or junction boxes may be readily attached to a support panel over a knock-out opening. The term knock-out opening is used to mean an opening formed in a panel by removing a prescored plug from the panel. The box is generally rectangular and has a base plate, a top plate and side walls. One side wall at least is opened to receive an electrical receptacle or component of a connector element, and the base is formed with a circular opening through which the wires may be directed for connection to the receptacle. A projection extends from the base from a position adjacent the opening. Spaced from the circular opening and opposite the projection is a radially extending rectangular opening through which is positioned an extended portion of a block which block is disposed within the box. The block has a threaded bore to receive a bolt extending through an adjacent side wall in a direction to move the block along the rectangular opening in directions toward and away from the projection adjacent the wire opening. The extended portion of the block will engage one side of the knock-out opening in a support panel formed by removing the knock-out plug and draw the projection against the diametrically opposite side of the opening to secure the box to the panel.

BRIEF DESCRIPTION OF THE DRAWING

The following detailed description will refer to the accompanying drawing wherein.

DESCRIPTION OF THE PREFERRED EMMBODIMENT

Figure 1:
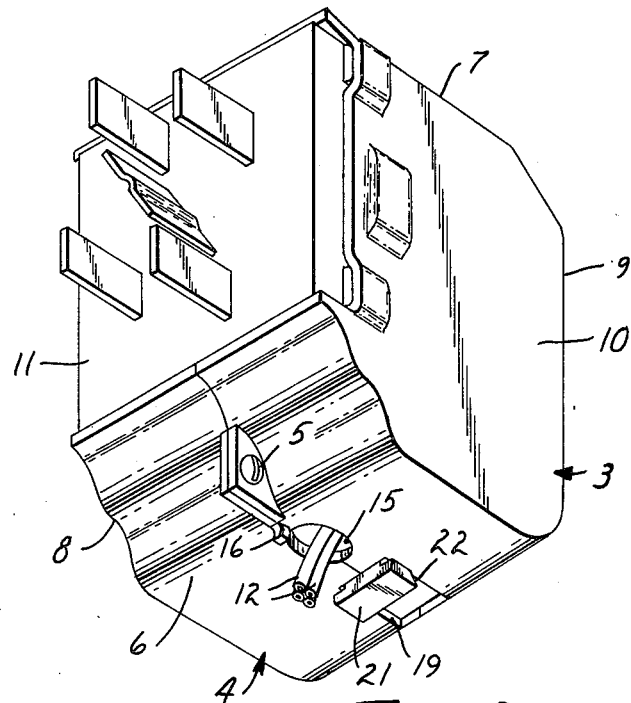
FIG. 1 is a perspective view of an electrical box formed in accordance with the present invention.

Referring now to the drawing there is illustrated in FIG. 1 an electrical receptacle box which is generally attached to a support panel of a light fixture or cabinet such that the internal fixture wiring can be joined to a prewired quick connect-type of electrical receptacle of an electrical connector for easy connection and disconnection to the electric supply cable or the like.

The box comprises a pair of mating shells 3 and 4, which when secured together by screw or bolt fasteners 5 form a rectangular housing having base plate or wall 6, a top plate 7 and side walls 8, 9, and 10 which form an opening in the fourth side for receiving an electrical receptacle. As illustrated the electrical receptacle, generally designated 11 is a male plug to which is secured the internal fixture wiring, which wires or conductors are designated 12. The receptacle 11 will connect with a female element 13 and to a source of current.

The base plate 6 is formed with a first opening 15. A projection 16 is formed on the shell 4 adjacent the opening 15 and extends outward from the base plate 6. This projection could have the appearance of a grommet and encircle the opening 15. The projection 16 serves as a component of the mounting means of the present invention and it has a surface slightly inclined from its distal end toward the base plate to wedge against an edge of the hole 17 in the support panel 18 of the light fixture or other member.

Spaced from the opening 15 on the side opposite the projection 16 and extending radially in relationship to the opening is a rectangular opening or slot 19. A metal stamping or block 20 is supported in the box and has an extended side portion 21 forming a clamp, which extended portion projects from the slot 19 in the direction away from the base plate as did the projection 16. The extended portion 21 has slots to guide it along the base plate and has a face 22 which is inclined to wedge against a side of the opening 17 in the support panel 18 on an edge opposite the inclined surface of the projection 16. The block 20 is bored and threaded to receive a screw fastener 24. The threaded bolt fastener 24 extends through an opening in an adjacent side wall 9 such that upon rotation of the bolt the block 20 moves toward or away from the projection 16.

As shown in FIG. 1 with the bolt 24 backed out of the block 20 the projection 16 and the projecting clamp portion 21 of the block 20 may be placed through an opening 17 in the support panel 18. The bolt 24 may then be turned into the block 20 and this will draw the clamp portion 21 and face 22 against one edge of the opening 17 while forcing the projection 16 against the diametrically opposite side of the opening 17, locking the electrical box to the support panel 18.

Figure 2:
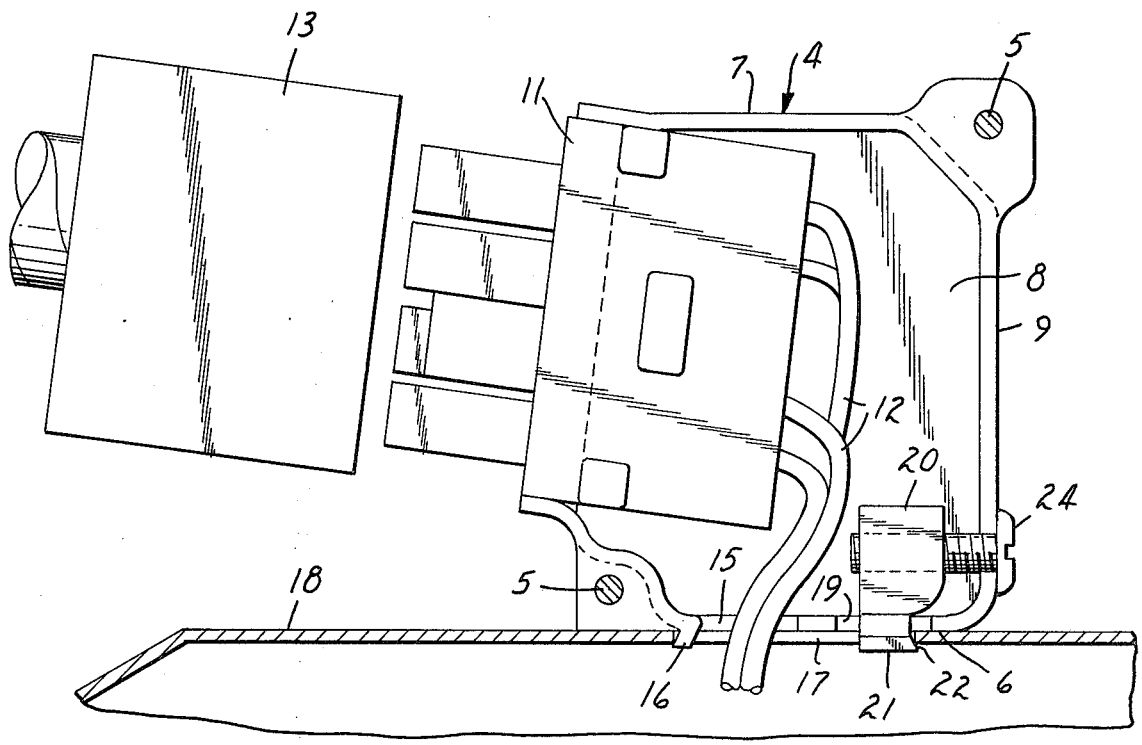
FIG. 2 is a side elevational view of one-half of the electrical box of FIG. 1 taken at the parting line and mounted to a support panel of a light fixture or the like, the fasteners for the box halves are shown in section.

The electrical receptacle is affixed to the electrical box in the opening provided in a side by detents in the side wall receiving projections on the electrical receptacle as seen in FIGS. 1 and 2.

Having thus disclosed the present invention with reference to a preferred embodiment, it is to be understood that modifications can be made in details of construction without departing from the spirit or scope of the invention.

We claim:

1. A box for attachment to a support panel over a standard knock-out opening, said box comprising a base plate a top plate and side walls defining a generally rectangular housing, one of said side walls having means supporting an electrical receptacle, said base plate having a circular opening, a projection extending from said base plate adjacent one edge of said opening, and having a slotted opening, a block slidably supported on said base plate and having a portion extending from said housing through said slotted opening, said block having a threaded bore in a portion of said block within said housing and a screw extending through a side wall and into said threaded bore of said block to move said block along said slotted opening in a direction away from said projection for clamping said projection and said extending portion of said block against opposite walls of a said knock-out opening to clamp said housing to a said panel.

* * * * *

UNITED STATES PATENT AND TRADEMARK OFFICE
CERTIFICATE OF CORRECTION

PATENT NO. : 4,139,254
DATED : February 13, 1979
INVENTOR(S) : Richard M. Hamilton and James A. Sievert It is certified that error appears in the above-identified patent and that said Letters Patent are hereby corrected as shown below:

Col. 4, line 26, after "plate" (first occurrence) insert
a -- , --.

Col. 4, line 30, after "said" (second occurrence) insert
the word -- circular --.

Signed and Sealed this

Eighth Day of May 1979

[SEAL]

Attest:

RUTH C. MASON
Attesting Officer

DONALD W. BANNER
Commissioner of Patents and Trademarks